May 23, 1933.  W. H. SILVER  1,910,185
LISTER
Filed Nov. 15, 1930   3 Sheets-Sheet 3
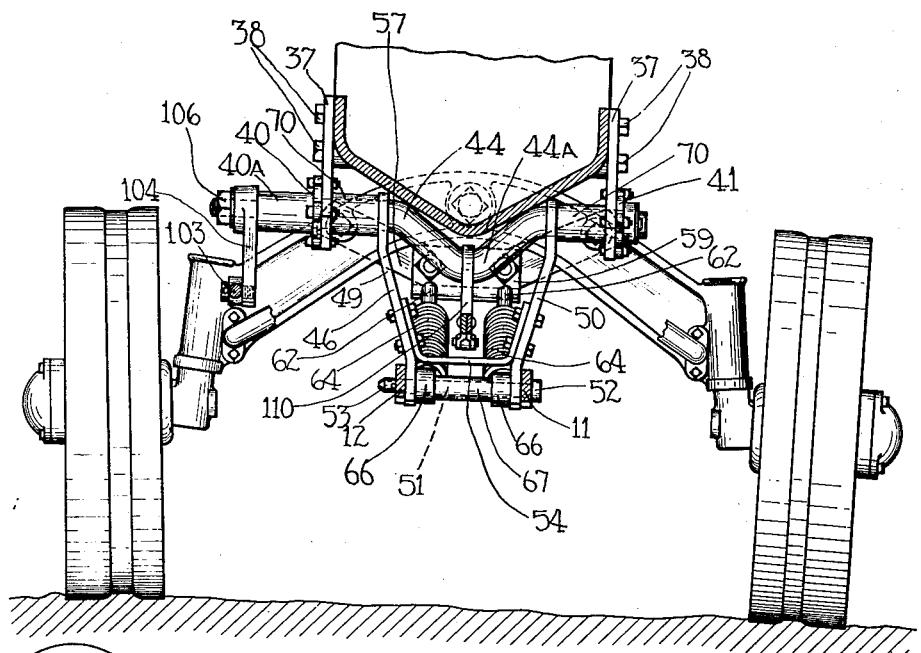
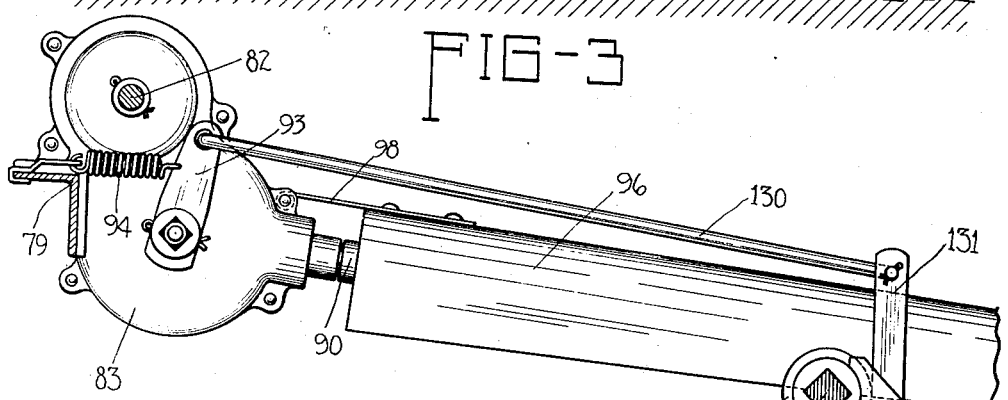
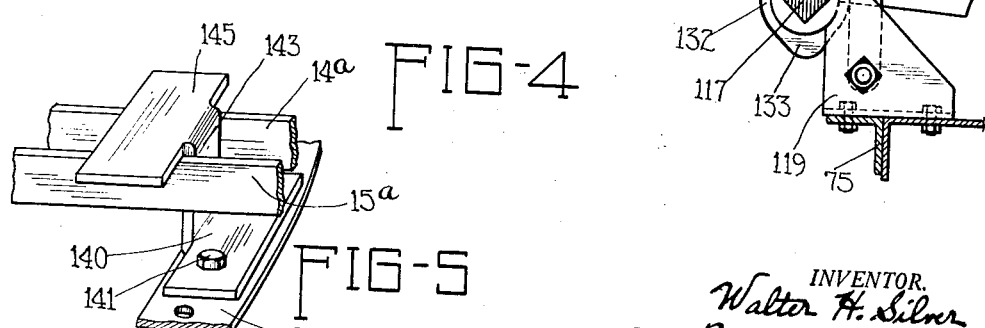
WITNESS
Walter Ackerman
INVENTOR.
Walter H. Silver
BY Brown, Jackson
Boettcher & Dienner
ATTORNEYS.

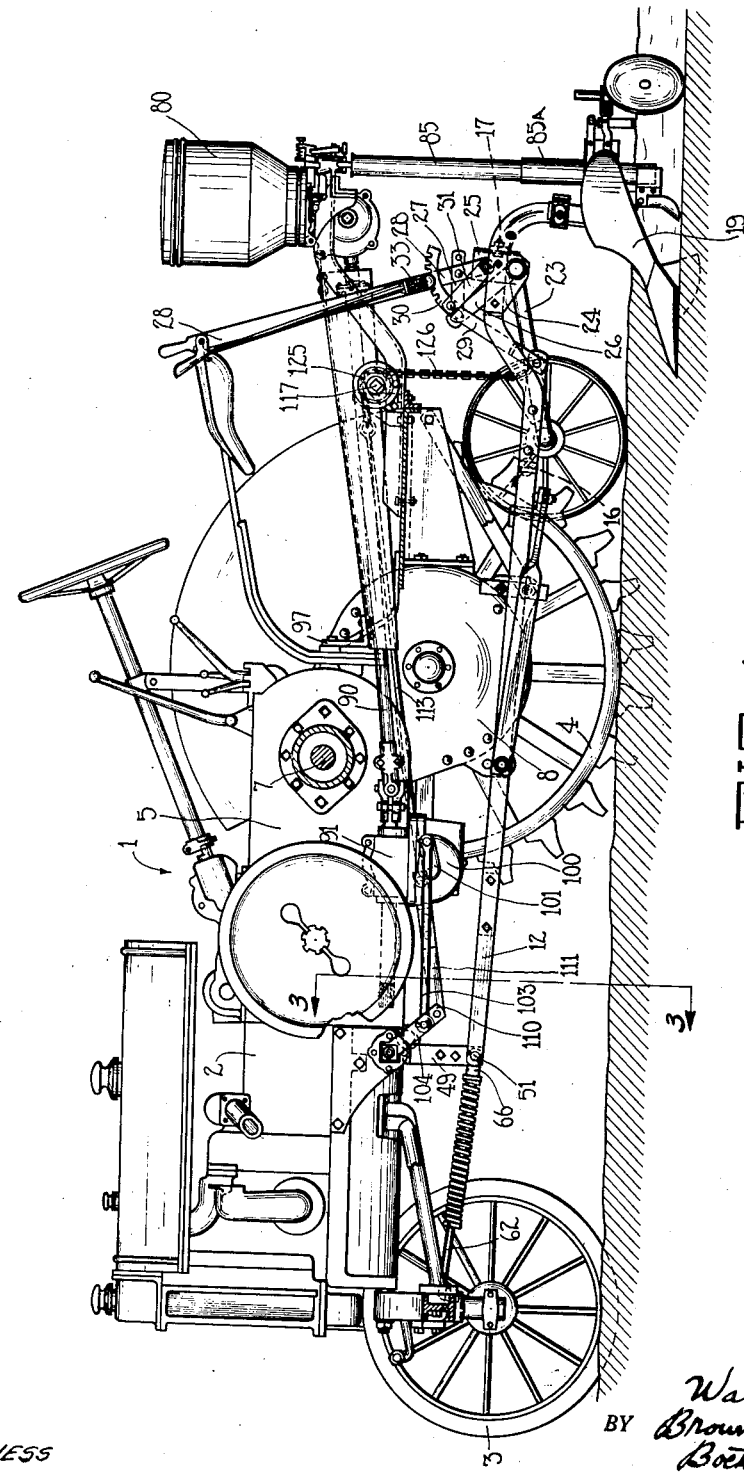

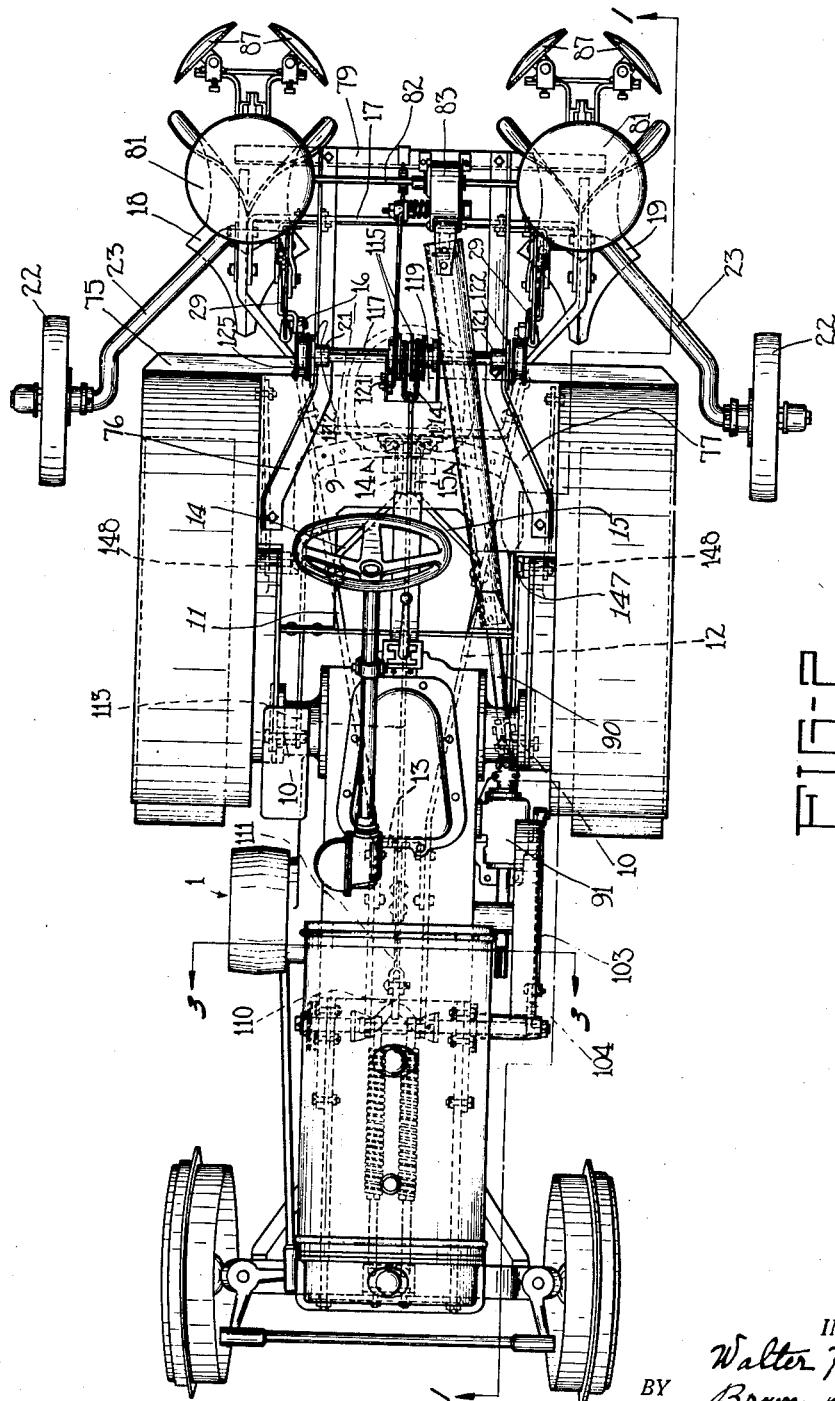

Patented May 23, 1933

REISSUED

MAR 12 1940

1,910,185

UNITED STATES PATENT OFFICE

WALTER H. SILVER, OF MOLINE, ILLINOIS, ASSIGNOR TO DEERE & COMPANY, OF MOLINE, ILLINOIS, A CORPORATION OF ILLINOIS

LISTER

Application filed November 15, 1930. Serial No. 495,873.

The present invention relates generally to agricultural implements and more particularly to a type of implement embodying an attachment adapted for attachment to or to be carried by a motor driven tractor so that when connected together the two parts function as a single power operated implement. More specifically, the present invention is principally concerned with the provision of a power driven lister adapted particularly for use in preparing and planting listed crops.

The chief object of the present invention is to provide an improved construction in certain details of the implement, such as, for example, an improved supporting and adjusting means for the lister beams, an improved means for limiting their lateral movement, and an improved supporting structure for the seeding mechanism of the lister.

Other objects and advantages of the present invention will be apparent to those skilled in the art after a consideration of the following detailed description of the preferred structural embodiment which is illustrated in the accompanying drawings, in which:

Figure 1 is a side elevation of a lister constructed in accordance with the present invention and in which certain parts are cut away to better show the structural details;

Figure 2 is a top plan view of a lister like that shown in Figure 1;

Figure 3 is an enlarged vertical section taken substantially along the lines 3—3 of Figures 1 and 2;

Figure 4 is an enlarged fragmentary view showing partly in section and partly in elevation the means for throwing the feeding mechanism out of operation when the lister beams are raised; and Figure 5 is an enlarged fragmentary perspective view of the connection between the lister beams and the usual draw bar of a tractor for limiting the lateral displacement of the beams.

Tn the illustrated embodiment the implement comprises the lister mechanism per se, including furrow openers and seed selecting mechanism, and a wheeled supporting structure in the form of a motor driven tractor.

The tractor is indicated in its entirety by the reference numeral 1 and, as viewed in Figure 1, is seen to comprise a motor 2, front wheels 3 and rear driving wheels 4, and housing castings 5 serving as the frame of the tractor. The rear driving wheels 4 are driven from the motor 2 through the usual transmission system including the countershaft 7 and suitable driving gears or chains enclosed in the drive chain housings 8. A draw bar 9 of the usual type is pivoted to the housing 8, as by pivot means 10, for vertical swinging movement.

The lister per se comprises two forwardly converging tool beams 11 and 12 suitably braced and connected together by means of braces 13 at the forward ends of the beams and braces 14, 15, and 16 between their ends, and by brace 17 at the rear. At their outwardly diverged or rearward ends the tool beams 11 and 12 carry the tools or furrow openers in the form of middle breaker bottoms 18 and 19.

Gauging mechanism is preferably associated with each of the furrow openers 18 and 19 for regulating the operating depth of the furrow openers. This mechanism comprises a gauge wheel 22 associated with each of the furrow openers or bottoms 18 and 19, and each gauge wheel 22 is journaled on the outwardly turned end of a crank axle 23 which, in turn, is journaled in a bracket 24 depending from the outer side of each of the beams 11 and 12, as best shown in Figure 1. Each of the crank axles 23 is also journaled in a cooperating bracket 25, spaced inwardly with respect to the brackets 24, and rigidly secured to the brace member 17.

As best shown in Figure 1, the crank axles 23 extend forwardly of their pivotal or journal support on the beams 11 and 12, and as best shown in Figure 2, these crank axles also extend outwardly beyond the rear drive wheels 4, thus bringing the gauge wheels 22 to a position adjacent the drive wheels 4.

The innermost end of each of the crank axles is provided with an arm 26, preferably formed integral therewith, and each of the arms 26 is connected by means of a horizontal link 27 to a manually operated depth adjusting lever 28 pivotally mounted on the upwardly extending portion of the bracket 25, as best shown in Figure 1. The brace member 16 is provided with turned ends extending along the plow beams 11 and 12 and the rear portions of these turned ends are formed to receive upwardly extending links 29. A notched sector 30 is associated with each of the adjusting levers 28, and each sector 30 is connected to the link 29 and to the bracket 25, as by means of a short link 31, best shown in Figure 1. Each of the depth adjusting levers include the usual detent mechanism 33 cooperating with the notches on the sectors 30 for adjustably holding the lever in position. It is clear that releasing the detent mechanism 33 on either of the depth adjusting levers 28 and rocking the latter will raise or lower the rear ends of the tool beams 11 and 12 relative to the corresponding gauge wheel 22 in contact with the ground. In this way the operating depth of the breaker bottoms 18 and 19 can be individually adjusted.

The forward ends of the tool beams 11 and 12 are supported near the forward end of the tractor 1 by means of a framework structure now to be described. Depending brackets 37 are secured, as by bolts 38, to either side of the tractor, and at their lower ends these depending brackets 37 are apertured and carry bearing flanges 40 and 41 bolted or otherwise secured thereto. A rock shaft 44 is journaled in the bearing flanges 40 and 41, and the intermediate portion of the rock shaft 44 is curved to correspond with the formation of the front casting of the tractor 1, as best shown in Figure 3. The rock shaft 44 supports a U-shaped supporting member 46, the latter depending from the rock shaft 44 and preferably freely journaled thereon. The U-shaped member 46 constitutes a framework for receiving the front ends of the tool beams 11 and 12. For this purpose the framework 46 comprises a pair of supporting bars 49 and 50, the upper ends of which are journaled on the rock shaft 44 and the lower ends of which are apertured to receive a supporting pin 51 to which the forwardmost ends of the beams 11 and 12 are pivoted. The pin 51 may be provided with a head 52 at one end and a pin 53 at the other end for holding the beams 11 and 12 and the supporting bars 49 and 50 in their proper operative relation. The supporting bars 49 and 50 are suitably connected by means of a U-shaped frame member 54.

For the purpose of applying draft effort to the tool beams 11 and 12, the lower end of the depending framework 46 and the forward ends of the beams 11 and 12 are connected to a bracket 57 which is bolted to the front face of the front wheel axle of the tractor. This connection is established by means of a short angle member 59 bolted to the bracket 57 and having a rearwardly extending flange 60 which, in turn, is provided with apertures receiving a pair of tension links 62. The rear ends of the tension links 62 receive the forward ends of springs 64 which are connected at their rear ends to eye members 66 embracing the pin 51, as best shown in Figure 3. A spacing sleeve 67 is carried by the pin 51 for the purpose of holding the eye members 66 in proper position thereon. Spacing sleeves 70 are also carried by the rock shaft 44 for the purpose of positioning the framework 46 thereon and to maintain the same substantially central of the tractor. Since the members 49 and 50 of the framework 46 are journaled on the rock shaft 44, the beams 11 and 12 are free to swing longitudinally with respect to the tractor and to stretch the tension springs 64 under excessive loads.

Turning to Figure 2, the tractor 1 includes a platform having a rear angle brace or transverse member 75 extending along the rear edge of the platform and connected respectively to the shields over the drive wheels 4. A supporting framework comprising the fore and aft or longitudinally extending frame bars 76 and 77 and a rear connecting transverse angle bar 79 is secured to the tractor platform. The seeding mechanism 80 is carried by the transverse angle bar 79, and this seed selecting mechanism includes the usual seed boxes 81, the driving shaft 82, the gear set 83, and the usual seed plates for selecting and depositing the seeds for planting. The seed tubes 85 extend downwardly in rear of the furrow openers 18 and 19 for the purpose of directing the seed into the furrow, and the furrow openers or bottoms 18 and 19 are provided with the usual covering disks 87 for directing soil onto the planted seeds. The driving shaft 82 and the gear shaft 83 is preferably driven from the power of a tractor by means of a longitudinally extending power shaft 90 connected by suitable connections to the power take-off 91 of the tractor.

The gear set 83 per se forms no part of the present invention and it is therefore not described in detail. It suffices to note that the gear set 83 includes appropriate gearing for driving the seeding shaft 82 at various speeds, and suitable clutch mechanism is provided for interrupting the drive from the power shaft 90 to the gearing connected with the drive shaft 82. This clutch mechanism is adapted to be thrown into and out of operation by means of an operating arm or crank 93 suitably biased to drive transmitting position by means of a tension spring 94. Means for moving the operating arm 93 for interrupting the drive will be described later. The gear set 83 is preferably of the type shown and described in a copending application, Serial No. 445,993, filed April 21, 1930, by Charles H. White to which reference may be had for the details of the gear set 83. The operator may be protected from accidental contact with the power shaft 90 by means of a shield 96 curved about the shaft 90 and suitably supported at its forward end to the tractor by means of a bracket 97 and to the housing of the gear set 83 by means of a supporting bar 98.

It is preferable in this type of implement that suitable connections be made for raising and lowering the operating tools from the power of the tractor. The structure described so far is particularly applicable for use with raising and lowering means for the breaker bottoms or furrow openers 18 and 19. For this purpose, the usual power lift 100 of the tractor has its crank arm 101 connected by means of a link 103 to a swinging crank or arm 104 secured to one end of the rock shaft 44. In order to bring the arm 104 and the link 103 into line with the power lift crank arm 101 this end of the rock shaft 44 is extended the proper distance and the bearing flange 40 is provided with a sleeve extension 40a. The arm 104 may be securely held onto the rock shaft 44 by means of a lock nut 106, or by any other suitable means. The middle or crank portion 44a of the rock shaft 44 is provided with a depending arm 110 (see Figure 3) welded or otherwise secured thereto. A rearwardly extending link 111 is pin connected to the lower end of the depending arm 110, and the rear end of the link 111 is pivotally connected with a tension member 113, best shown in Figures 1 and 2. The rear end of the tension member 113 is connected to the bight of a chain 114, the two ends of which are wrapped partially around and are rigidly connected to sheaves 115 fixed to the mid-portion of a transverse lifting shaft 117 journaled to bearings provided in the vertical flanges to a U-shaped bracket 119 bolted to the rear of the tractor platform in the center thereof. The lifting shaft 117 is also journaled in bearings 121 provided in the upstanding brackets 122 fixed at their lower ends to the vertical flanges of the longitudinal frame members 76 and 77.

The lifting shaft 117 is provided at its outer ends with sheaves 125 to each of which a lifting chain 126 is connected. The lower ends of the lifting chains 126 are connected to the turned and rearwardly extending ends of the brace member 16.

By the construction described above whenever the power lift of the tractor is tripped, the power lift crank arm 101 is swung longitudinally of the tractor and occasions a similar swinging of the arm 104, thereby rocking the rock shaft 44. When the power lift crank arm 101 is swung forwardly the rock shaft 44 swings the depending arm 110 forwardly and exerts a pull through the tension link 113 on the chain 114. The latter therefore unwinds from the sheaves 115 thereby turning the lifting shaft 117. This movement of the lifting shaft 117 causes the lifting chains 126 to wind up on the associated sheaves 125 which, in turn, raises the rear ends of the beams 11 and 12 and elevates the bottoms 18 and 19, bringing the same from their operating position to their inoperative or transport position. The seed tubes 85 include a telescoping section 85a carried by the furrow openers 18 and 19 and which telescopes with respect to the upper sections when the furrow openers 18 and 19 are raised.

It is desirable to interrupt the drive to the seed selecting mechanism simultaneously with the lifting of the tools or bottoms 18 and 19, and to provide for this arrangement I pivotally connect a link 130 to the operating arm 93 of the gear shaft 83 and connect the link at its forward end to a pivoted cam follower 131 mounted on one of the vertical flanges of the U-shaped bracket 119. This cam follower is in operative relation with a cam 132 fixed onto the lifting shaft 117, the cam 132 is provided with a raised portion 133 which is so arranged on the lifting shaft 117 that the initial movement of the shaft in raising the lister beams occasions a swinging of the cam follower member 131 which, in turn, swings the operating arm 93 forwardly to interrupt the gear connections in the gear set 83, thus interrupting the drive from the power shaft 90 to the seeding shaft 82. When the beams 11 and 12 are lowered, the spring 94 returns the arm 93 to operative position and also holds the cam follower 131 in operative relation with respect to the cam 132 on the lifting shaft 117.

In implements including tool beams connected to the forward portion of a supporting wheeled frame or tractor, it is frequently desirable to provide means for limiting the lateral movement of the beams with respect to the wheeled frame or tractor. As embodied in the present structure, this important feature of the present invention includes mechanism for floatingly connecting the beams themselves to the usual draw bar of the tractor and is so arranged that the lateral movement of the beams 11 and 12 is thereby limited. Referring for the moment to Figure 2, it will be observed that the brace members 14 and 15 are connected at their upper ends to the beams 11 and 12 respectively. The brace members 14 and 15 converge inwardly and rearwardly and at their rear ends they are provided with parallel closely spaced portions 14a and 15a respectively. The extreme ends of these members are riveted or otherwise secured to the central portion of the brace member 16.

Referring more particularly to Figure 5, the connection between the draw bar 9 of the tractor and the beams 11 and 12 whereby the floating draw bar of the tractor is operable to limit the lateral movement of the lister with respect to the tractor is seen to comprise a bracket 140 having a base portion bolted, as by bolts 141, to the draw bar 9, a central or intermediate portion 143 extending vertically upward between the parallel portions of the two brace members 14 and 15, and an integral plate member 145 extending over the upper edges of the brace members 14a and 15a. The draw bar is free to float and pivot about the front pivotal connections 10 with the drive housings 8. Thus the lister beams 11 and 12 are capable of vertical movement but are restrained from lateral movement by virtue of their connection with the draw bar 9. As shown in Figure 2, a pair of rub plates 147 are bolted to the inner sides of the drive housings 8 of a tractor, preferably by means of countersunk bolts 148 in order that the rub plates may prevent a flat surface against which the sides of the draw bar 9 may rub. This particular structure reinforces the draw bar 9 and enables the same to effectively resist all side thrusts which may be imposed thereon by the lister.

While I have shown and described and illustrated in the accompanying drawings the preferred structural embodiment of the present invention, it is to be understood that my invention is not to be limited to the specific structure shown and described but that, in fact, widely different means may be employed in the practice of the broader aspects of my invention.

What I claim, therefore, and desire to secure by Letters Patent is:

1. In an implement of the class described, in combination, a tractor having a power lift, a rock shaft journaled on the tractor spaced forwardly of the rear thereof, operating connections between said rock shaft and the power lift, a pair of tool beams pivotally connected with said rock shaft, and raising and lowering means for said beams actuated by movement of said rock shaft.

2. In an implement of the class described, in combination, a tractor having a power lift, a pair of journal brackets secured to either side of the tractor near the forward end thereof, a rock shaft rotatably supported in said brackets, a lifting shaft journaled on the tractor near the rear thereof, connections between said shafts, tool beams extending fore and aft with respect to the tractor and pivotally supported by said rock shaft, said beams being adapted to be raised and lowered by said lifting shaft, and power actuated connections between the rock shaft and the power lift of the tractor.

3. In an implement of the class described, in combination, a tractor having a power lift, a pair of journal brackets secured to either side of the tractor near the forward end thereof, a rock shaft rotatably supported in said brackets, an arm secured to said shaft and connected with the power lift of the tractor, a lifting shaft journaled on the tractor near the rear thereof, a second arm on said rock shaft and connected with the lifting shaft, tool beams extending fore and aft with respect to the tractor and pivotally supported by said rock shaft, connections between the tool beams and the lifting shaft whereby the beams can be raised and lowered by the power of the tractor, and yielding means for retaining said tools in position relative to said rock shaft.

4. An agricultural implement comprising, in combination, a wheeled frame, a rock shaft journaled in said frame, tool beams extending longitudinally of the frame, supporting means for one end of said beams pivoted coaxially with respect to said rock shaft, and means operable by said rock shaft for raising and lowering said beams.

5. An agricultural implement comprising, in combination, a wheeled frame, a rock shaft journaled in said frame, tool beams extending longitudinally of the frame, supporting means for one end of said beams pivoted coaxially with respect to said rock shaft, said beams being pivoted to said supporting means, and spring means biasing said supporting means and beams to a forward position relative to the tractor, and means operable by said rock shaft for raising and lowering said beams.

6. An agricultural implement comprising, in combination, a wheeled frame, a rock shaft journaled in said frame, near the forward end thereof, tool beams extending longitudinally of the frame, a U-shaped supporting member for the beams and having its ends journaled on said rock shaft and its intermediate portion connected with the forward ends of the beams, and means including said rock shaft for raising and lowering the tool beams.

7. An agricultural implement comprising, in combination, a wheeled frame, a rock shaft journaled in said frame, tool beams extending longitudinally of the frame, supporting means for the beams carried by said rock shaft, and means operable by said rock shaft for raising and lowering said beams.

8. An agricultural implement comprising, in combination, a wheeled frame, a rock shaft journaled in said frame, operating mechanism carried by the frame, tool beams extending longitudinally of the frame, supporting means for the beams carried by said rock shaft, and means operable by said rock shaft for throwing said mechanism into and out of operation.

9. An agricultural implement comprising, in combination, a wheeled frame, depending brackets on either side of the frame, bearing flanges secured to said brackets, a rock shaft journaled in said flanges, one end extending beyond the corresponding flange and provided with an operating crank arm thereon, tool beams extending longitudinally of the frame, a supporting framework for one end of the beams and pivotally carried by said rock shaft, spacing sleeves on the rock shaft for positioning said framework, a depending arm secured to said rock shaft, and connections between said last named arm and the other end of the beams for raising and lowering the latter by swinging said operating crank arm.

10. An agricultural implement comprising, in combination, a wheeled frame, depending brackets on either side of the frame, bearing flanges secured to said brackets, a rock shaft journaled in said flanges, one end extending beyond the corresponding flange and provided with an operating crank arm thereon, tool beams extending longitudinally of the frame, a supporting framework for one end of the beams and pivotally carried by said rock shaft, said framework comprising a U-shaped member comprising side bars and an intermediate brace, the upper ends of said bars being journaled on said rock shaft, a pin carried at the lower ends of the side bars for receiving the beams, spacing sleeves on the rock shaft between the upper ends of said bars and said depending brackets for positioning said framework, a depending arm secured to said rock shaft, and connections between said last named arm and the other end of the beams for raising and lowering the latter by swinging said operating crank arm.

11. An agricultural implement comprising, in combination, a wheeled frame, depending brackets on either side of the frame, bearing flanges secured to said brackets, a rock shaft journaled in said flanges, one end extending beyond the corresponding flange and provided with an operating crank arm thereon, tool beams extending longitudinally of the frame, a supporting framework for one end of the beams and pivotally carried by said rock shaft, said framework comprising a U-shaped member comprising side bars and an intermediate brace, the upper ends of said bars being journaled on said rock shaft, a pin carried at the lower ends of the side bars for receiving the beams, spacing sleeves on the rock shaft between the upper ends of said bars and said depending brackets for determining the position of said framework, a bracket near the forward end of the frame, yieldable draft means connected with said bracket and with said member, a depending arm secured to said rock shaft, and connections between said last named arm and the other end of the beams for raising and lowering the latter by swinging said operating crank arm.

12. In an implement of the class described, in combination, a tractor having a drawbar adjacent the rear thereof, a laterally swingable beam connected with the tractor near one end of the latter, and means connecting the beam to said drawbar to limit the lateral movement of the beam.

13. In an implement of the class described, in combination, a tractor having a vertically swinging drawbar, a lister connected with the tractor and including a pair of fore and aft extending beams swingable laterally and having earth working tools carried thereby, and connecting means between the drawbar and the beams for allowing vertical movement of the lister and for limiting the lateral movement thereof.

14. In an implement of the class described, in combination, a tractor having a vertically swinging drawbar pivotally connected with the tractor to swing about a transverse axis, a lister connected with the tractor and including a pair of fore and aft extending beams swingable laterally and having earth working tools carried thereby, bracing means for the beams including a transverse brace member connecting said beams and a pair of braces connected to the beams and to said brace member, said braces having closely spaced portions extending in parallel relationship, and a bracket attachable to the drawbar and including an upper plate overlying said spaced brace portions and a connecting web passing therebetween, said bracket and drawbar establishing a floating connection for the lister for permitting vertical movement but limiting lateral movement of the lister.

15. In an implement of the class described, in combination, a tractor having a vertically swinging drawbar, a lister connected with the tractor and including fore and aft extending tool beams, connecting means between the drawbar and said beams for limiting the relative lateral movement of said beams with respect to the drawbar, and rub plates on the tractor and operable to restrain the lateral movement of the drawbar relative to the tractor.

16. An agricultural implement of the class described comprising, in combination, a tractor having a power take-off and a power lift, furrow opening means connected with the tractor, operating mechanism associated with said furrow opening means, a supporting framework for said mechanism including a pair of longitudinal members carried by the tractor and a transverse bar carried by said members, said mechanism being supported by the transverse bar, means including a shaft journaled on said longitudinal members for raising and lowering said furrow openers from said power lift, and driving means for said mechanism carried by the bar and actuated from the power take-off of the tractor.

17. An agricultural implement of the class described comprising, in combination, a tractor having a power lift, furrow opening means connected with the tractor, operating mechanism associated with said furrow opening means, a supporting framework for said mechanism including a pair of longitudinal members carried by the tractor and a transverse bar carried by said members, said mechanism being supported by the transverse bar, means for driving said mechanism, means including a shaft journaled on said longitudinal members for raising and lowering said furrow openers from said power lift, and connections actuated by rotation of said shaft for interrupting the driving means for said mechanism.

18. An agricultural implement of the class described comprising, in combination, a tractor having a power take-off and a power lift, furrow opening means connected with the tractor, operating mechanism associated with said furrow opening means, a supporting framework for said mechanism including a pair of longitudinal members carried by the tractor and a transverse bar carried by said members, said mechanism being supported by the transverse bar, means for driving said mechanism including a gear set, means including a shaft journaled on said longitudinal members for raising and lowering said furrow openers from said power lift, connections actuated by rotation of said shaft for interrupting the driving means for said mechanism, said connections including an operating arm on the gear set and cam mechanism on said shaft, and driving means for said mechanism carried by the bar and actuated from the power take-off of the tractor.

19. In an implement of the class described, in combination, a tractor, two forwardly converging beams, means pivoting the beams to the tractor, ground working tools carried by the beams, gauge wheels adjustably connected with the beams and adapted to gauge the operating depth of said tools, brace means connecting said beams at the rear, adjusting means for said gauge wheels pivotally connected with the brace means, operating mechanism for said implement, a supporting frame for said mechanism comprising a plurality of fore and aft extending members secured to the tractor and a transverse member connecting the first named members, driving means for said operating mechanism comprising a driving shaft and an associated gear set for controlling the operation of said shaft, a rock shaft journaled on said fore and aft extending members, connections between the shaft and said beams whereby rocking of the shaft raises and lowers the beams, connections operated by the power of the tractor for rocking said rock shaft, and means actuated by the raising and lowering of the beams for throwing said gear set out of and into operation.

20. In an implement of the class described, in combination, a tractor, two forwardly converging beams, means pivoting the beams to the tractor, ground working tools carried by the beams, gauge wheels adjustably connected with the beams and adapted to gauge the operating depth of said tools, brace means connecting said beams at the rear, adjusting means for said gauge wheels pivotally connected with the brace means, crank axles for said gauge wheels, journal brackets on each of said beams and said brace means for mounting each of the crank axles, and means connecting the crank axles with said adjusting means.

21. In an implement of the class described, in combination, a tractor having a power take-off and a power lift, a rock shaft journaled on the tractor spaced forwardly of the rear thereof, operating connections between said rock shaft and the power lift, two forwardly converging tool beams having earth working tools and gauge wheels at their rear ends, means journaled on said rock shaft for supporting the forward ends of said tool beams, brace means connecting said beams at the rear, adjusting means for said gauge wheels pivotally connected with the brace means, operating mechanism for said implement, a supporting frame for said mechanism comprising a plurality of fore and aft extending members secured to the tractor and a transverse member connecting the first named members, driving means for said operating mechanism comprising a driving shaft and an associated gear set for controlling the operation of said shaft, means operatively connecting the driving means with the power take-off of the tractor, a lifting shaft journaled on said fore and aft extending members, connections between the shaft and said beams whereby rocking of the shaft raises and lowers the beams, operative connections between the lifting shaft and said rock shaft whereby the operation of the power lift raises and lowers said beams, and cam means operated by said lifting shaft in raising said tool beams for throwing said gear set out of operation.

22. In combination, a tractor, power lift means associated with said tractor, a rock shaft journaled intermediate the ends of the tractor, operating connections between said power lift beams and said rock shaft, tool beams associated with said rock shaft, and means responsive to oscillations of said rock shaft for imparting raising and lowering movements to said beams.

23. In combination, a tractor, power lift means associated with said tractor, a rock shaft journaled intermediate the ends of said tractor, a second shaft carried by said tractor, connections between said shafts, tool beams supported by said rock shaft and connected with said second shaft to be raised and lowered thereby, connections between said shafts, and connections between said power lift means and said rock shaft for actuating said second shaft to raise and lower said beams.

24. In combination, a tractor, power lift means associated with said tractor, a rock shaft journaled intermediate the ends of the tractor, a lifting shaft carried by the tractor adjacent the rear thereof, connections between said shafts, tool beams having their forward ends supported by said rock shaft and their rear ends connected with said lift shaft whereby said means are responsive to raising and lowering movements of said lift shaft, and connections between said power lift means and said rock shaft and effective through said first named connections to raise and lower said beams.

25. In combination, a tractor, power lift means associated with said tractor, a rock shaft journaled on the tractor forward of said power lift means, a lift shaft carried by said tractor adjacent the rear end thereof, operative connections between said shafts, tool beams supported at their forward ends by said rock shaft, connections between the rear ends of said tool beams and said lifting shaft, and connections between said power lift means and said rock shaft for actuating the lifting shaft to raise and lower said beams.

26. In an implement of the class described, in combination, a tractor having a drawbar, a beam connected at its forward end with the tractor, and means carried by the draw bar and connected with the beam to limit the lateral movement of said beam.

27. In an implement of the class described, in combination, a tractor having a drawbar, a beam connected with the tractor forwardly of said drawbar, and bracket means carried by the drawbar for connecting the beam therewith to limit the lateral movement of said beam.

28. In combination, a tractor having a drawbar, a substantially rigid framework including generally longitudinally extending members connected together adjacent their forward ends, means pivotally connecting the forward ends of said members with the tractor whereby free vertical swinging movement of said framework is provided for, and means connected with said drawbar for restraining lateral movement of said framework.

29. In combination, a tractor having a drawbar, a substantially rigid framework including generally longitudinally disposed beam members converging forwardly, means connecting their forward converged ends together, means pivotally connecting the forward ends of said beam members with the tractor at a point between the front and rear wheels thereof, said connecting means providing for relatively free vertical swinging movement of said framework and a limited lateral swinging movement thereof with respect to the tractor, and means having at least a portion connected with the drawbar of the tractor for limiting the lateral movement of said framework.

30. In combination, a tractor having a drawbar, a substantially rigid framework including generally longitudinally extending members having forwardly converging ends connected together, means pivotally connecting the forward ends of said beams with the tractor and providing for relatively free vertical swinging movement and limited lateral movement of said framework, furrow openers carried by said framework and disposed within the tread of the rear traction wheels of the tractor, means connected between the drawbar of the tractor and said framework for restraining the lateral movement of the latter, crank axles secured to said framework and extending forwardly and outwardly from the furrow openers, and gauge wheels mounted on said crank axles.

31. The combination with a tractor including front and rear wheels, of an implement attachment comprising a plurality of laterally shiftable beams having forwardly converging ends, means pivotally connecting the forward ends of said beams with said tractor at a hitch point disposed forwardly of the rear tractor wheels, earth working devices on the rear portions of said beams, two crank axles having pivotal connection with the rear portions of said beams at laterally spaced points thereof, gauge wheels mounted on said crank axles, and means for limiting the lateral movement of said beams with respect to the tractor.

32. The combination with a tractor including a drawbar and front and rear wheels, of an implement attachment comprising a plurality of laterally shiftable beams having forwardly converging ends connected together, means pivotally connecting the forwardly converging ends of said beams with said tractor at a hitch point disposed centrally of the tractor, two crank axles having pivotal connection with the rear portions of said beams and forwardly and outwardly extending crank ends disposed adjacent the rear wheels of the tractor, gauge wheels mounted on said crank axle ends, and means connecting said beams with the tractor to limit the lateral movement thereof.

33. In combination, a tractor, a member extending transversely of the tractor adjacent the back thereof and pivotally connected to the tractor for movement on a substantially horizontal axis, an implement comprising a beam structure extending fore and aft of the tractor, means pivotally connecting said beam structure to the tractor forwardly of said member and for swinging movement substantially on a horizontal axis, the beam structure being capable of lateral movement relative to the tractor, cooperating means carried by the beam structure and the transverse member for limiting the lateral movement of the implement relative to the tractor and lifting means separate from said transverse member for raising and lowering the beam structure from and toward the ground, said lifting means comprising crank axles pivotally connected to the beam structure remote from the forward end thereof.

In witness whereof, I hereunto subscribe my name this 8th day of November A. D., 1930.

WALTER H. SILVER.